United States Patent Office 3,366,539
Patented Jan. 30, 1968

3,366,539
PROCESS OF ENHANCING AND PROLONGING THE EFFECTIVENESS OF INSECT CONTROL GRANULES
Herbert A. Woodbury, St. Joseph, Mo., assignor to Woodbury Chemical Company, St. Joseph, Mo.
No Drawing. Filed June 9, 1964, Ser. No. 373,836
6 Claims. (Cl. 167—42)

This invention relates to pest and growth control compositions applied to sorptive carriers such as certain clays, fuller's earth, bentonite, ground shell corncob, etc., generally, but not limited to, having a particle size of from mesh 15 to mesh 60, hereinafter referred to as "granules"; and specifically to the application of additional substances to the insecticide-impregnated or herbicide-impregnated granules to enhance and/or prolong their effectiveness.

Because of the ease of application of pest and growth control compositions in granular form, and because, in some instances, the pest and/or growth control compositions are more effective in granular form than in any other, the use of granular forms of these compositions has become widespread and popular.

In many cases it is desirable to extend the life of the pest and/or growth control granule beyond its normal life, as rapid breakdown of the granule and the composition incorporated in it would render it partially or completely ineffective for the purpose for which used. In many cases the pest or growth control granule is applied at a time, such as crop planting time, when the insect or weed that it is designed to control has not yet made its appearance, and it is necessary that the granule and its active ingredient(s) be preserved to as great an extent as possible until the time of that appearance, and in many cases preserved until the period of potential damage has passed.

The greatest cause of granule breakdown is moisture: soil moisture, rain or irrigation. Once the granule is dissolved, rain or irrigation may cause leaching of the pest or growth control composition from the area in which its control function must operate. In the case of some chemical compounds, water reacts unfavorably with the chemical, causing it to partially or completely lose its killing or protective powers. It would be desirable, therefore, to protect the granule and the chemical compound in it from the harmful effects of moisture.

As a specific example, ethyl parathion (O,O-diethyl-O-paranitrophenylthiophosphate) is a powerful and effective insecticide of short life. It will kill the larvae of corn rootworm very effectively if applied at, or very shortly before, the time the larvae are active in the soil. It will not, when applied at planting time, protect against the rootworm larvae when they make their appearance at a later date, and protect through the period of damage.

I have found that the application of additional substances, to be described below (and hereinafter called "enhancing agent"), to a pest and/or growth control granule will enhance and/or prolong the effectiveness of the granular composition. As mentioned above, State agricultural experiment stations have found 10 lbs. per acre of 10% ethyl parathion granules, applied at planting time, ineffective in the control of corn rootworm larvae. Yet, when my "enhancing agent" is applied to 10% ethyl parathion granules during their manufacture, 10 lbs. per acre of these granules are very effective in controlling corn rootworm larvae even eight to ten weeks after their application to the soil, and even at rates considerably lower than 10 lbs. per acre they are effective. It has been demonstrated by a well-known laboratory unconnected with this inventor that granules treated with this "enhancing agent" are much more resistant to water breakdown than untreated granules, or granules treated with other substances. These "enhanced" or "stabilized" 10% parathion granules have been registered under the Federal Insecticide, Fungicide, and Rodenticide Act.

The "enhancing agent" may be made from resins such as phenolics, polyethylene, polypropylene or similar types, combined with polymers. One successful formulation I have used is:

Mix "A"—Melt 80 lbs. polyethylene resin and 12 lbs. oleic acid in a tank at 230–240 degrees F. In another tank 494 lbs. water is heated to 205 degrees F. Add 14 lbs. organic amine to this tank and mix for 2 minutes. Then add resin-oleic acid melt to water-amine mix slowly, and cool to room temperature.

Mix "B"—Heat 333 lbs. water to 195 degrees F. Agitate, and add 5½ lbs. ammonium hydroxide 28%. Add 56 lbs. alkali soluble resin. Keep temperature at 195 degrees F., and add 5½ lbs. ammonium hydroxide 28%. Agitate for 45 minutes, keeping temperature at 195 degrees F. Add this to mix "A."

Mix "C"—Put 80 lbs. water in tank. Add 200 lbs. styrene polymer emulsion (36% solids), and mix. Mix 6.6 lbs. dibutyl phthalate and 5.2 lbs. tributoxyethyl phosphate in a bucket, and add slowly to polymer-water mix. Agitate 30 minutes. Add 211 lbs. water and 50 lbs. acrylic polymer emulsion (36% solids) and mix well. Add this mix to mix "A," which now contains all three mixes.

In making the "enhanced" granules, there is little departure from the process with which every formulator of pest or growth control granules is familiar, except for the "enhancement." To make 100 lbs. "enhanced" 20% aldrin (1,2,3,4,10,10 - hexachloro - 1,4,4a,5,8,8a - hexahydro-1,4,5,8 - dimethanonaphthalene) granules, for example, one would charge 62.7 lbs. of a suitable carrier, such as fuller's earth of the proper mesh size, into a tumbler mixer. 2 lbs. of a 50% solution of urea in water is sprayed onto the granules while tumbling, then 34.3 lbs. of an oil solution of aldrin, containing 6 lbs. actual aldrin (100% basis) per gallon is sprayed onto the granules, and finally 5 lbs. of the "enhancing agent" is sprayed onto the tumbling granules. Evaporation of the water in the "enhancing agent" leaves the treated granular formulation containing 1% solids of the "enhancing agent."

The above is used merely as an example. Varying strengths of active ingredients of different pest or growth control chemicals may be made into granules, and, if desired or applicable, "enhanced" in the manner above described.

I claim:
1. A process of enhancing and prolonging the effectiveness of insect control granules comprising impregnating granules with insect control compounds, contacting said impregnated granules with from 2% to 10% by weight of a solution comprising low molecular weight polyethylene resin, styrene polymer, acrylic polymer emulsions, and water.

2. A process of enhancing and prolonging the effectiveness of parathion (O,O-diethyl-O-p-nitrophenylthiophosphate) granules comprising impregnating granules with parathion, contacting said impregnated granules with from 2% to 10% by weight of a solution comprising low molecular weight polyethylene resin, styrene polymer, acrylic polymer emulsions, and water.

3. The process of claim 1, wherein the solution is formed from a mixture of a first, second and third mix, said first mix comprising polyethylene resin, oleic acid, organic amine and water; said second mix comprising an ammonium hydroxide and an alkali soluble resin, and said third mix comprising water, styrene polymer emulsion, dibutyl phthalate, tributoxyethyl phosphate, and acrylic polymer emulsion.

4. The process of claim 3, wherein said first and second mixes are heated to a temperature between 195° F. and 240° F.

5. The process of claim 3, wherein said granules comprise an inert carrier and an insect control material.

6. The process of claim 3, wherein 5 lbs. of said solution per 100 lbs. of product are sprayed onto said granules while tumbling said granules.

References Cited

UNITED STATES PATENTS

| 3,062,634 | 11/1962 | Talbert | 71—2.1 |
| 3,143,460 | 8/1964 | Pearce | 167—42 |

FOREIGN PATENTS

| 898,915 | 6/1962 | Great Britain. |
| 589,926 | 12/1959 | Canada. |

LEWIS GOTTS, *Primary Examiner.*

J. O. THOMAS, Jr., *Examiner.*

G. H. HOLLRAH, *Assistant Examiner.*